United States Patent
Kang et al.

(10) Patent No.: US 11,476,529 B2
(45) Date of Patent: Oct. 18, 2022

(54) BATTERY PACK WITH BUS BAR OUTSIDE CELL REGION

(71) Applicant: SAMSUNG SDI CO., LTD., Yongin-si (KR)

(72) Inventors: Iloh Kang, Yongin-si (KR); Deayon Moon, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 214 days.

(21) Appl. No.: 16/728,313

(22) Filed: Dec. 27, 2019

(65) Prior Publication Data

US 2020/0274117 A1 Aug. 27, 2020

(30) Foreign Application Priority Data

Feb. 21, 2019 (KR) .................. 10-2019-0020489

(51) Int. Cl.
| | |
|---|---|
| *H01M 50/20* | (2021.01) |
| *H01M 10/04* | (2006.01) |
| *H01M 50/502* | (2021.01) |
| *H01M 10/42* | (2006.01) |

(52) U.S. Cl.
CPC ....... *H01M 50/20* (2021.01); *H01M 10/0422* (2013.01); *H01M 10/425* (2013.01); *H01M 50/502* (2021.01); *H01M 2220/20* (2013.01)

(58) Field of Classification Search
CPC ............. H01M 50/20; H01M 10/0422; H01M 10/425; H01M 50/502; H01M 2220/20; H01M 2010/4271; H05K 1/18; H05K 2201/10037; H05K 2201/10272; Y02P 70/50; Y02E 60/10

See application file for complete search history.

(56) References Cited

U.S. PATENT DOCUMENTS

| | | |
|---|---|---|
| 9,451,710 B2 | 9/2016 | Park |
| 9,905,830 B2 | 2/2018 | Kim et al. |
| 10,367,180 B2 | 7/2019 | Kim et al. |
| 10,403,876 B2 | 9/2019 | Choi et al. |
| 11,376,969 B2 | 7/2022 | Lee et al. |
| 2010/0124693 A1 | 5/2010 | Kosugi et al. |
| 2012/0189902 A1 | 7/2012 | Kim |
| 2014/0212695 A1 | 7/2014 | Lane et al. |

(Continued)

FOREIGN PATENT DOCUMENTS

| | | |
|---|---|---|
| CN | 106654138 A | 5/2017 |
| CN | 106711366 A | 5/2017 |

(Continued)

OTHER PUBLICATIONS

Machine translation of KR 2017-0042113A, Yi Sang, 2017 (Year: 2017).*

(Continued)

*Primary Examiner* — Kwang Han
(74) *Attorney, Agent, or Firm* — Lee IP Law, P.C.

(57) ABSTRACT

A battery pack includes a plurality of battery cells, a circuit board electrically connecting the plurality of battery cells together, the circuit board extending along a first direction and a second direction, and a bus bar connected to the circuit board to form a charge/discharge path, wherein the bus bar extends along a third direction, different from the first and second directions.

20 Claims, 7 Drawing Sheets

(56) References Cited

U.S. PATENT DOCUMENTS

| | | |
|---|---|---|
| 2016/0056514 A1 | 2/2016 | Ahn |
| 2017/0025660 A1 | 1/2017 | Shin et al. |
| 2017/0141365 A1* | 5/2017 | Kim ................ H01M 10/0468 |
| 2017/0256826 A1* | 9/2017 | Hong ............... H01M 10/4257 |
| 2017/0264107 A1 | 9/2017 | Cheon et al. |
| 2019/0044120 A1 | 2/2019 | Ota et al. |
| 2020/0235372 A1 | 7/2020 | Fuhr et al. |

FOREIGN PATENT DOCUMENTS

| | | | | |
|---|---|---|---|---|
| CN | 107170945 A | 9/2017 | | |
| CN | 107771362 A | 3/2018 | | |
| EP | 3 217 452 A | 9/2017 | | |
| KR | 10-2012-0020044 A | 3/2012 | | |
| KR | 10-2016-0128793 A | 11/2016 | | |
| KR | 10 2017 0042113 A | 4/2017 | | |
| KR | 2017-0042113 A | * 4/2017 | ............. | H01M 2/10 |
| KR | 10-2018-0076145 A | 7/2018 | | |
| WO | WO 2015/066078 A1 | 5/2015 | | |
| WO | WO 2017/152140 A1 | 9/2017 | | |
| WO | WO 2018/124494 A2 | 7/2018 | | |

OTHER PUBLICATIONS

Extended European search report issued by the European Patent Office dated Apr. 30, 2020 in the examination of corresponding European Patent Application No. 20155889.7.
Chinese Office action dated Mar. 2, 2022 for corresponding CN Patent Application No. 202010081777.0.
Chinese Notice of Allowance dated Aug. 11, 2022 for corresponding CN Patent Application No. 202010081777.0.

* cited by examiner

BATTERY PACK WITH BUS BAR OUTSIDE CELL REGION

CROSS-REFERENCE TO RELATED APPLICATION

Korean Patent Application No. 10-2019-0020489, filed on Feb. 21, 2019, in the Korean Intellectual Property Office, and entitled: "Battery Pack," is incorporated by reference herein in its entirety.

BACKGROUND

1. Field

The present disclosure relates to a battery pack.

2. Description of the Related Art

In general, secondary batteries are rechargeable, unlike primary batteries. Secondary batteries may be used as energy sources for mobile devices, electric vehicles, hybrid vehicles, electric bicycles, uninterruptible power supplies, or the like. Depending on the type of external devices in which they are used, the secondary batteries may be a single battery or a battery module in which a plurality of batteries are connected and combined into one unit.

A small mobile device, e.g., a mobile phone, may operate for a certain time according to the output and capacity of a single battery. However, for other applications, e.g., long-time driving or high-power driving such as in the case of an electric vehicle or a hybrid vehicle with high power consumption, a battery module including a plurality of batteries may be preferred due to output and capacity issues. The output voltage or the output current of the battery module increases according to the number of built-in batteries.

SUMMARY

According to one or more embodiments, a battery pack includes a plurality of battery cells, a circuit board electrically connecting the plurality of battery cells together, the circuit board extending along a first direction and a second direction; and a bus bar connected to the circuit board to form a charge/discharge path, wherein the bus bar extends along a third direction, different from the first and second directions.

For example, the third direction may be perpendicular to the circuit board.

For example, the bus bar may extend along the second direction and may have a dimension along the third direction that is greater than a dimension along the first direction.

For example, the bus bar may include a body portion extending along the second direction, and a connection portion at intermittent positions along the second direction in the body portion and connected to a connection hole at a corresponding position along one side portion of the circuit board.

For example, the body portion and the connection portion may extend along the third direction.

For example, the connection portion may be connected to a connection hole formed in a cell region in which the battery cell may be arranged.

For example, the bus bar may further include a bent portion extending in a bent form between the body portion and the connection portion to connect the body portion outside the cell region and the connection portion inside the cell region to each other.

For example, the circuit board may include a first surface facing the battery cell and a second surface opposite to the first surface along the third direction, and the connection portion may be inserted into the connection hole in a direction facing from the first surface to the second surface of the circuit board and includes an end portion exposed from the second surface.

For example, the connection portion may include a connection protrusion having a first end inserted into the connection hole.

For example, the connection protrusion may include a pair of connection protrusions separated from each other along the second direction by a recess.

For example, the recess may accommodate a coupling material.

For example, the pair of connection protrusions may be individually inserted into a corresponding connection hole in the circuit board.

For example, the bus bar may include first and second bus bars extending along first and second side portions of the circuit board that are opposite to each other along the first direction.

For example, the battery cells may be arranged in first and second rows along the first direction, the battery cells of first rows are biased toward the second side portion of the circuit board along the first direction to provide space for a first connection hole between the first rows and the first side portion of the circuit board, and the battery cells of second rows are biased toward the first side portion of the circuit board along the first direction to provide space for a second connection hole between the second rows and the first side portion of the circuit board.

For example, the first and second bus bars may be respectively connected to the first and second connection holes.

For example, the circuit board is configured to electrically connect the plurality of battery cells in units of modules, adjacent first and second rows of battery cells forming one module, the battery cells of first rows are biased toward the second side portion of the circuit board along the first direction to provide space for a first connection hole between the first rows and the first side portion of the circuit board, and the battery cells of second rows are biased toward the first side portion of the circuit board along the first direction to provide space for a second connection hole between the second rows and the second side portion of the circuit board.

For example, the first and second bus bars may be respectively connected through the first and second connection holes to first and second polarities of the module that are different from each other.

For example, the bus bar may include a cutout portion extending from a first end side close to an output terminal toward a second end side thereof.

For example, the cutout portion may separate the first end side of the bus bar into a first region not directly connected to the output terminal and a second region directly connected to the output terminal, and the first and second regions may be electrically connected to each other through a third region outside the cutout portion.

For example, the first region may include a connection portion of the first end side connected to the circuit board, and the second region may be relatively farther from the circuit board along the third direction than the first region.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
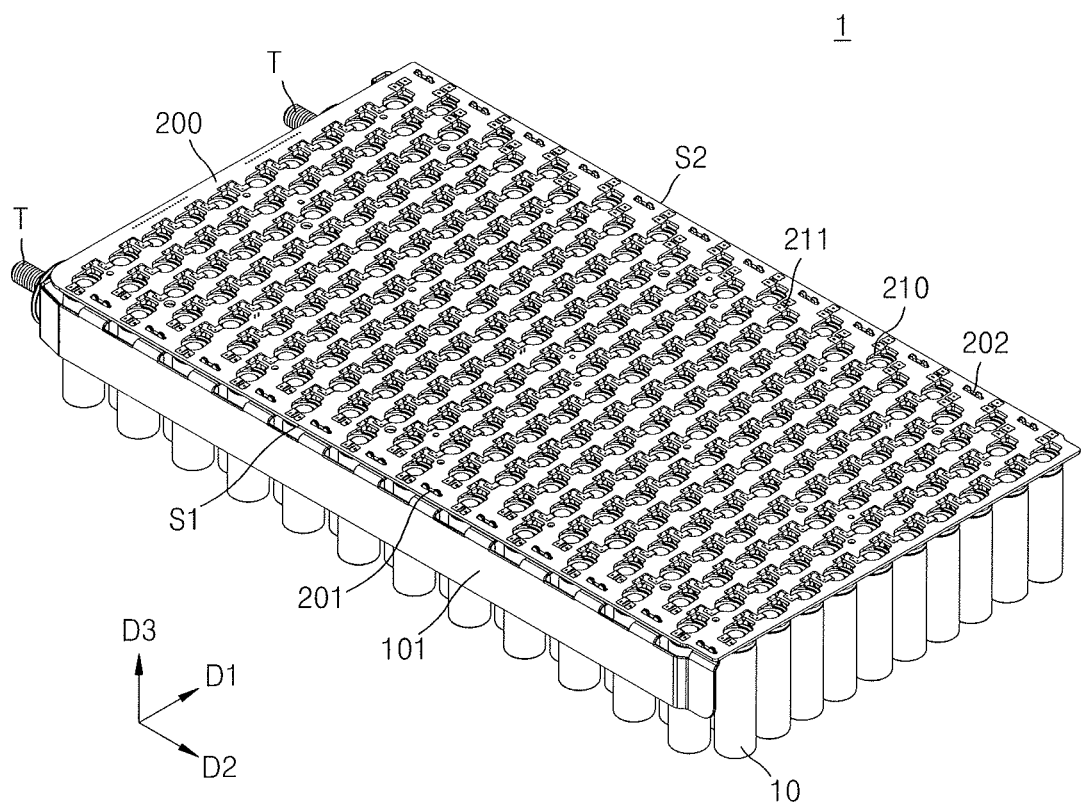
FIG. 1 illustrates a battery pack according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, battery packs according to example embodiments of the present disclosure will be described with reference to the accompanying drawings.

Figure 2:
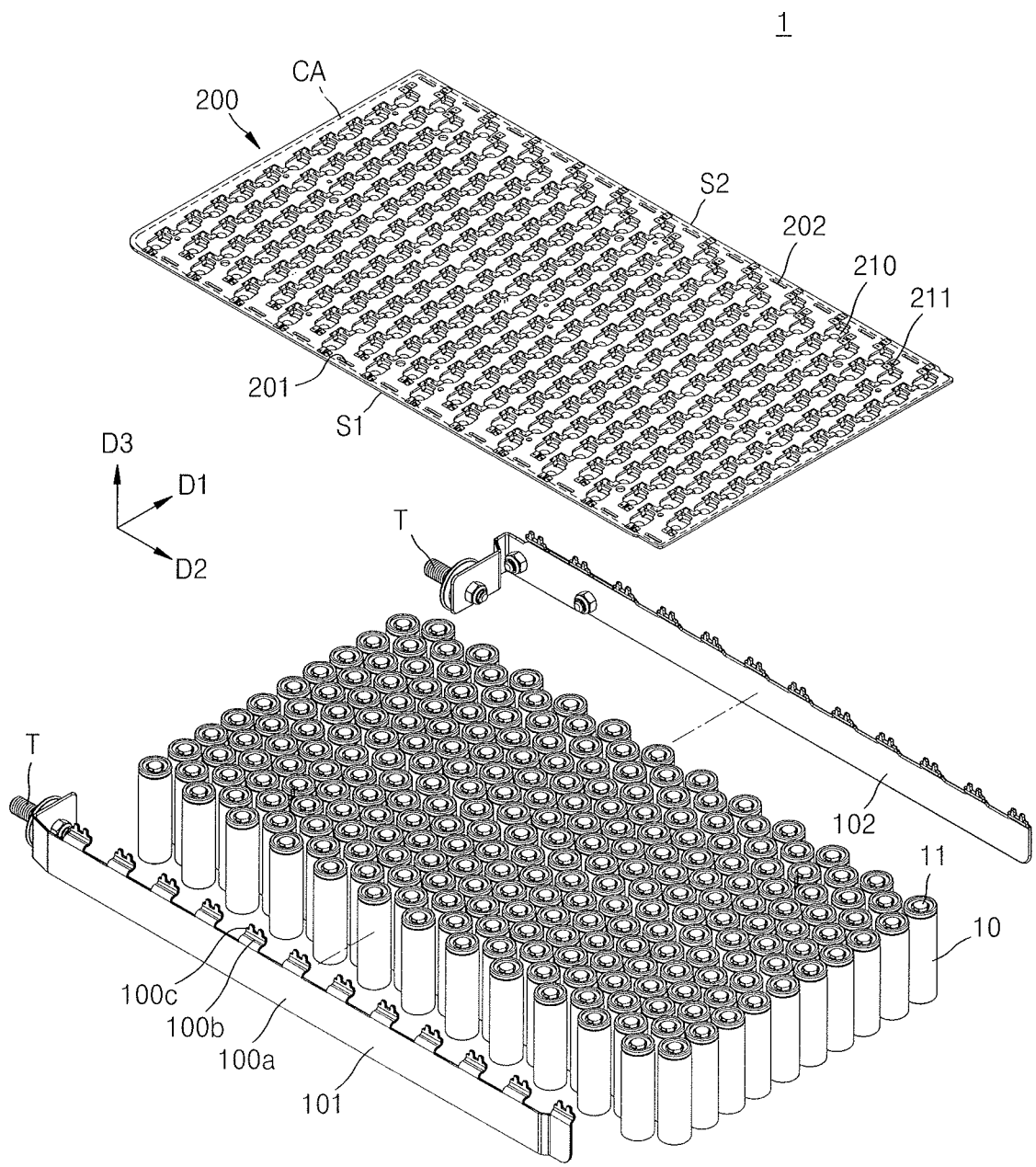
FIG. 2 illustrates an exploded perspective view of the battery pack illustrated in FIG. 1.

FIG. 1 illustrates a battery pack 1 according to an embodiment of the present disclosure. FIG. 2 is an exploded perspective view of the battery pack illustrated in FIG. 1.

Referring to the drawings, the battery pack 1 may include a plurality of battery cells 10, a circuit board 200 for electrically connecting the plurality of battery cells 10, and bus bars 101 and 102 for forming a charge/discharge path therebetween the circuit board 200 and an output terminal T. The battery pack 1 may extend widthwise along a first direction D1, lengthwise along a second direction D2, and depthwise (or thickness) along a third direction D3.

The circuit board 200 may extend across a first end portion 11 of each of the plurality of battery cells 10 to electrically connect different battery cells 10 together. For example, the circuit board 200 may extend in a direction perpendicular (the first direction D1) to the lengthwise direction (the second direction D2) of the battery pack 1, form an electrical connection with the first end portion 11 of each battery cell 10, and serially connect different polarities (e.g., positive and negative electrodes) formed at the first end portion 11 of each of the plurality of battery cells 10. In an embodiment of the present disclosure, the battery cell 10 may form connection of both of different polarities (e.g., positive and negative electrodes) through the first end portions 11.

In an implementation, the battery cell 10 may form electrical connections of different polarities (e.g., positive and negative electrodes) through both the first end portion and a second end portion, opposite the first end portion along the third direction D3, of each battery cell 10. In this case, the circuit board 200 may include two circuit boards 200 forming an electrical connection with the first end portion 11 and the second end portion extending across both the first and second end portions in the lengthwise direction D2, respectively. A plurality of terminal holes 210 for forming an electrical connection with the first end portion 11 of each battery cell 10 may be formed in the circuit board 200 at positions corresponding to each battery cell 10.

For reference, for convenience of description, only the terminal hole 210 of the circuit board 200 is illustrated in some drawings attached to the specification. Since a battery cell 10 is to be located at each terminal hole 210, the arrangement of the terminal holes 210 illustrated in the drawings may be understood as the arrangement of the battery cells 10 corresponding to respective terminal holes 210.

Figure 3:
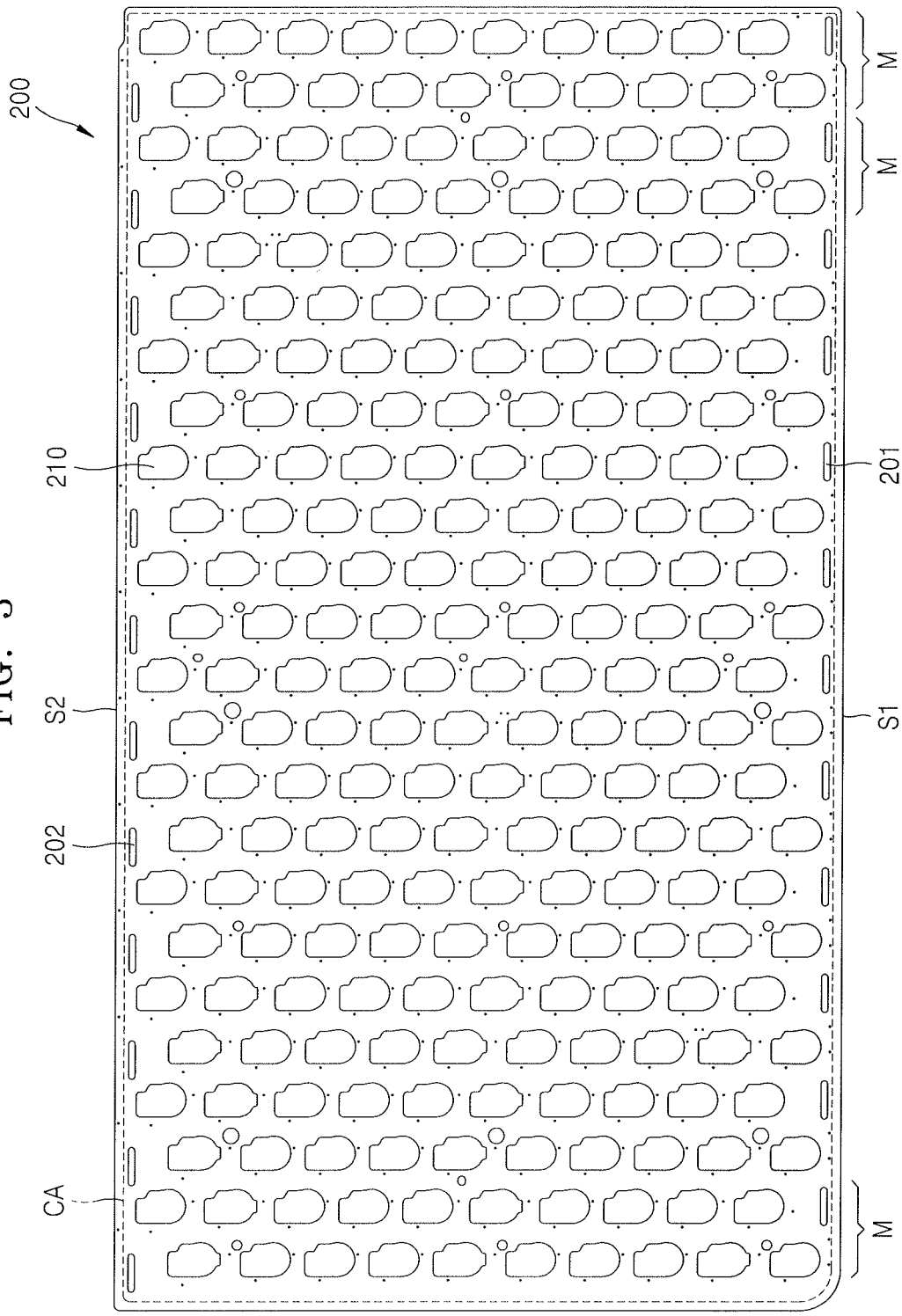
FIG. 3 illustrates a diagram of a structure of a circuit board in FIG. 1.

FIG. 3 illustrates the circuit board 200 in FIG. 1. The circuit board 200 may electrically connect different battery cells 10. For example, the circuit board 200 may connect different battery cells 10 in units of modules M. The battery cells 10 (or the terminal holes 210) may be arranged in rows along the first direction D1 in which first and second side portions S1 and S2 of the circuit board 200 face each other. The battery cells 10 of two rows adjacent to each other along the second direction D2 may be electrically connected to each other by the circuit board 200 such that the battery cells 10 of two rows adjacent along the second direction D2 to each other form one module M.

Herein, that different battery cells 10 are electrically connected to each other by the circuit board 200 may inclusively mean that different battery cells 10 are electrically connected through any type of conductive pattern supported on the circuit board 200. For example, as well as a conductive pattern provided in the circuit board 200, when different battery cells 10 are connected by a separate connection tab 211 (see FIG. 2) supported on the circuit board 200, the connection tab 211 (see FIG. 2) may also be understood as an example of the conductive pattern supported on the circuit board 200.

The battery cells 10 of two rows (or the terminal holes 210 of two rows) forming one module M may be arranged at alternate positions, e.g., shifted along the first direction D1 relative to a row immediately adjacent along the second direction D2. For example, among the battery cells 10 of two rows (or the terminal holes 210 of two rows) forming one module M, the battery cells 10 (or the terminal holes 210) of a first row may provide space for a first connection hole 201 between the first row and the first side portion S1. In particular, the first row may be arranged at a position biased toward the second side portion S2 of the circuit board 200, e.g., a distance between a terminal hole 210 closest to the second side portion S2 along the first direction D1 is shorter than a distance between a terminal hole 210 closest to the first side portion S1. Similarly, the battery cells 10 (or the terminal holes 210) of a second row may provide space for a second connection hole 202 between the second row and the second side portion S2 while being arranged at a position biased toward the first side portion S1 of the circuit board 200, e.g., a distance between a terminal hole 210 closest to the first side portion S1 along the first direction D1 is shorter than a distance between a terminal hole 210 closest to the second side portion S2.

Thus, the first and second rows in one module M are partially offset, e.g., by less than a dimension of a terminal hole 210 along the first direction D1, so that the first connection hole 201 may be provided in the first row and the second connection hole 202 may be provided in the second row. By arranging the positions of the battery cells 10 (or the terminal holes 210) of two rows adjacent to each other at alternate positions between the first and second side portions S1 and S2 of the circuit board 200, the first and second connection holes 201 and 202 may be arranged between the battery cells 10 (or the terminal holes 210) along the second direction D2 and may be arranged in a cell region CA in which a group of battery cells 10 forming the battery pack are arranged.

As illustrated in FIG. 2, the cell region CA may be a square region, e.g., in a D1-D2 plane, surrounding a group of battery cells 10 forming the battery pack 1 and may mean a region projected onto the circuit board 200. By intensively arranging the first and second connection holes 201 and 202 in the cell region CA of the circuit board 200, an increase in the volume of the entire battery pack 1 due to a dead space may be prevented and the battery pack 1 may have a high energy density per the same volume.

As described above, because the position of the terminal hole 210 formed in the circuit board 200 corresponds to the position of the battery cell 10, the positions of the terminal holes 210 of two rows adjacent to each other may be arranged at alternate positions between the first and second side portions S1 and S2 of the circuit board 200 to provide space for the first and second connection holes 201 and 202 between the first and second side portions S1 and S2 of the circuit board 200. In contrast, when the first and second connection holes 201 and 202 are in a separate space allocated outside the terminal hole 210 while arranging the terminal holes 210 of two rows at the same position between the first and second side portions S1 and S2 of the circuit board 200, the size of the entire circuit board 200 may increase. Thus, the volume of the entire battery pack 1 may increase and the energy density thereof may decrease.

As described below, bus bars 101 and 102 (see FIG. 2, more particularly, first and second bus bars 101 and 102) may be connected to the first and second connection holes 201 and 202, In particular, the bus bars 101 and 102 may be connected to the first and second connection holes 201 and 202 in the cell region CA while extending from the outside of the cell region CA to the inside of the cell region CA, as described in detail below.

Figure 4:
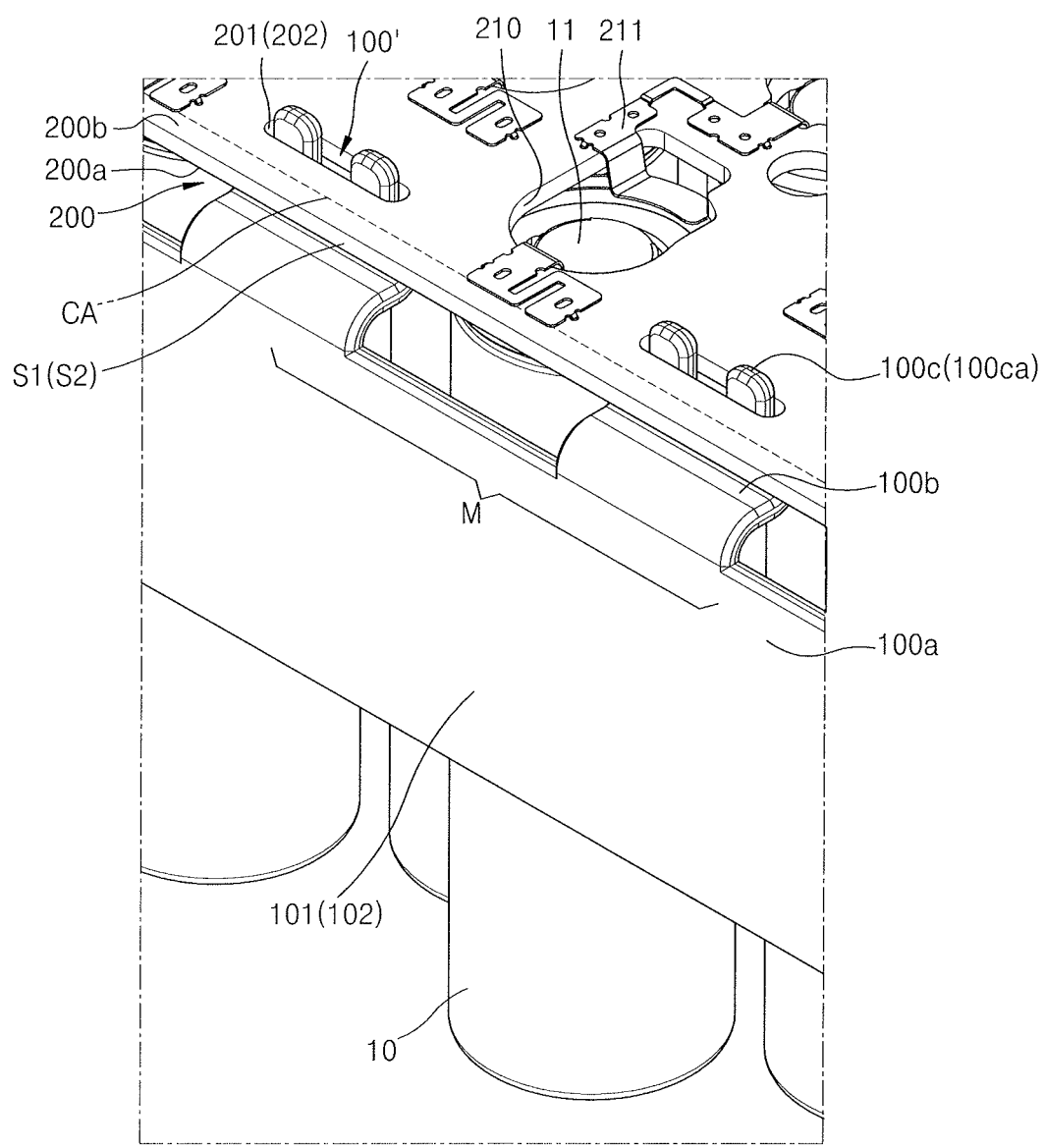
FIG. 4 illustrates a perspective view of the connection between a bus bar and the circuit board in FIG. 1.
Figure 5:
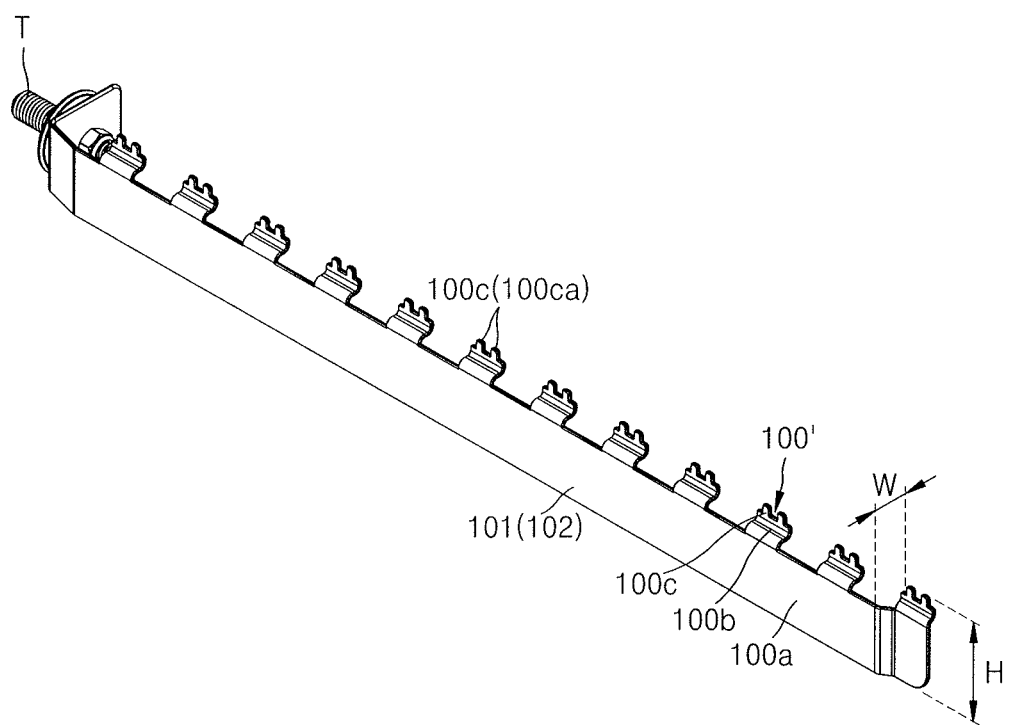
FIG. 5 illustrates a perspective view of the bus bar in FIG. 4.

FIG. 4 is a perspective view illustrating the connection between the bus bar 101 (102) and the circuit board 200 in FIG. 2. FIG. 5 is a perspective view of the bus bar 101 (102) illustrated in FIG. 4.

Referring to the drawings, bus bars 101 and 102 (more particularly, first and second bus bars 101 and 102) may be connected to the first and second connection holes 201 and 202 of the circuit board 200. The bus bars 101 and 102 may form a charge/discharge path between the first and second connection holes 201 and 202 of the circuit board 200 and the output terminal T (see FIG. 2).

For example, the bus bars may include first and second bus bars 101 and 102 respectively connected to the connection holes 201 and 202 to be connected to different polarities (e.g., positive and negative electrodes) of a group of battery cells 10 forming a module (M) unit. For example, the first and second bus bars 101 and 102 may be respectively connected to different first and second polarities (e.g., positive and negative electrodes) of each module M through the first and second connection holes 201 and 202. The first and second bus bars 101 and 102 may be arranged on respective sides of the first and second side portions S1 and S2 of the circuit board 200 and may provide the charge/discharge path of a plurality of battery cells 10 in different modules M while extending along the first and second side portions S1 and S2 of the circuit board 200, e.g., fully along the first and second side portions S1 and S2 along the second direction D2. For reference, although only one side portion of the circuit board 200 is illustrated in FIG. 4, one side portion of the illustrated circuit board may correspond to the first side portions S1 or the second side portions S2 of the circuit board 200 and the illustrated bus bars 101 and 102 may correspond to the first bus bar 101 on the side of the first side portion S1 or the second bus bar 102 on the side of the second side portion S2.

The bus bars 101 and 102 may be arranged in an upright position in the lengthwise direction of the battery cell 10, e.g., along the third direction D3. When the bus bars 101 and 102 are described as being arranged in an upright position in the lengthwise direction of the battery cell 10 or with respect to the circuit board 200 may mean that the bus bars 101 and 102 extend along a D2-D3 plane. For example, a dimension H (see FIG. 5) of the bus bars 101 and 102 measured in the height direction perpendicular to the circuit board 200, i.e., the third direction D3, may be greater than a dimension W thereof (see FIG. 5) measured in the widthwise direction (or depth) parallel to the circuit board 200., i.e., the first direction D1.

When the bus bars 101 and 102 are arranged in an upright position, allocation of an additional space in the lengthwise direction of the battery cell 10 (or the vertical direction of the circuit board 200), i.e., the third direction D3, may be unnecessary and allocation of an additional space in the planar direction of the circuit board 200 may be minimized. Thus, dead space may be reduced and a high-density battery pack having a high energy density per the same volume may be provided. If bus bars were to be arranged in the planar direction of the circuit board 200, i.e., in the D1-D2 plane, additional space would be required in the planar direction of the circuit board 200, decreasing energy density.

The first and second bus bars 101 and 102 may include a body portion 100a extending along the first and second side portions S1 and S2 of the circuit board 200, i.e., a0long the second direction D2, and a connection portion 100c formed at an intermittent position in the lengthwise direction of the body portion 100a and connected to the first and second connection holes 201 and 202 at a corresponding position along the first and second side portions S1 and S2 of the circuit board 200. The body portion 100a may be a portion occupying most of the bus bars 101 and 102 and may be arranged in an upright position in the lengthwise direction of the battery cell 10, i.e., may extend along the direction D3. The body portion 100a and the connection portion 100c may be arranged in an upright position in the lengthwise direction of the battery cell 10 or in the vertical direction of the circuit board 200 and may be respectively arranged outside and inside the cell region CA in which a group of battery cells 10 forming the battery pack 1 are arranged, as described below.

Referring to FIG. 4, the first and second connection holes 201 and 202 of the circuit board 200 may be formed in the cell region CA of the circuit board 200, and the bus bar 100 (more particularly, the connection portion 100c) may be connected to the first and second connection holes 201 and 202 in the cell region CA. In this case, the bus bars 101 and 102 may further include a bent portion 100b extending in a bent form between the body portion 100a and the connection portion 100c to connect the body portion 100a outside the cell region CA and the connection portion 100c inside the cell region CA. Through the bent portion 100b bent from the body portion 100a arranged outside the cell region CA and extending inside the cell region CA, the first and second connection holes 201 and 202 may be intensively formed in the cell region CA of the circuit board 200, thus increasing the energy density of the battery pack 1.

The bent portion 100b may correspond to a configuration extending in the planar direction of the circuit board 200 among the bus bars 101 and 102, i.e., may extend along the first direction D1 to connect the connection portion 100c and the body portion 100a 5 and along the second direction D2. Thus, the bent portion 100b may switch the extension direction toward the inside of the cell region CA (the inside of the circuit board 200) while connecting the connection portion 100c and the body portion 100a arranged in a standing position in the vertical direction of the circuit board 200, i.e., along the third direction D3. The bent portion 100b may have some deviation according to a bending operation of the bus bars 101 and 102 or by a springback after bending, but may generally extend in a direction parallel to the circuit board 200, e.g., the D1-D2 plane.

In an embodiment of the present disclosure, the bus bars 101 and 102 may include a body portion 100a arranged outside the circuit board 200 and a bent portion 100b extending from the body portion 100a to a lower portion of the circuit board 200. According to a particular design, the body portion 100a may be arranged outside the circuit board 200 or, when the circuit board 200 is designed to be somewhat wider, at least a portion of the body portion 100a may be arranged below the circuit board 200, e.g., such that the circuit board 200 and the body portion 100a partially overlap along the third direction D3.

The connection portion 100c may be inserted into the first and second connection holes 201 and 202 toward a second surface 200b from a first surface 200a of the circuit board 200, such that an end portion of the connection portion 100c may be exposed to the outside through the second surface 200b. Here, the first surface 200a of the circuit board 200 may mean a surface facing the battery cell 10 and the second surface 200b of the circuit board 200 may mean a surface opposite to the battery cell 10 along the third direction D3. The connection portion 100c may include a connection protrusion 100ca of the end portion inserted into the first and second connection holes 201 and 202 of the circuit board 200. The connection protrusion 100ca may include a pair of connection protrusions 100ca spaced apart from each other along the second direction D2, e.g., by a recess 100' therebetween. In an implementation, the connection protrusion 100ca may include a pair of connection protrusions 100ca separated from each other by the recess 100' or may include three or more connection protrusions 100ca.

The connection protrusion 100ca and the first and second connection holes 201 and 202 may be coupled, e.g., soldered. The recess 100' between the connection protrusions 100ca may increase a coupling force by increasing the contact area with a coupling material, e.g., solder, may reduce the accumulation height of the coupling material by accommodating the coupling material, may reduce the dead space by lowering the height of the coupling material accumulated in the vertical direction of the circuit board 200, i.e., the third direction D3, and may prevent an unnecessary electrical short. In the embodiment illustrated in FIG. 4, the first and second connection holes 201 and 202 may be formed in an elongated slot shape extending long in one direction, i.e., the second direction D2, to accommodate the pair of connection protrusions 100ca together.

Figure 6:
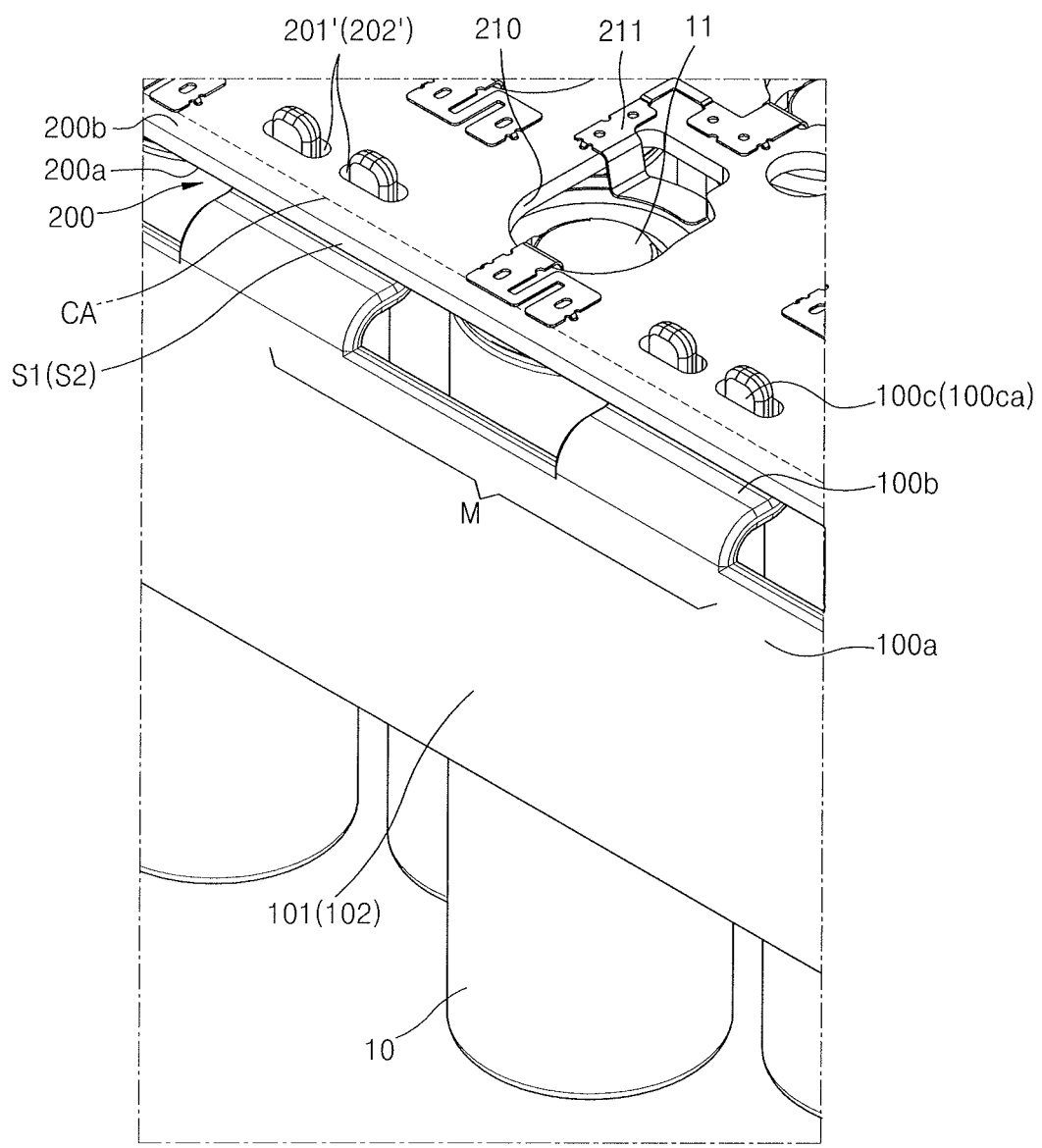
FIG. 6 illustrates a modified embodiment of FIG. 4.

FIG. 6 illustrates a modified embodiment of FIG. 4.

The connection holes of the circuit board 200 may include a pair of first and second connection holes 201' and 202' separated from each other along the second direction D2 to correspond to the shape of the connection protrusion 100ca.

Each connection protrusions 100ca may form an individual coupling with each of the first and second connection holes 201' and 202', thereby increasing the coupling area between the entire connection portion 100c and the first and second connection holes 201' and 202'. For example, because the coupling area between the connection portion 100c and the first and second connection holes 201' and 202' corresponds to the sum of the coupling areas along the periphery of the individually-formed connection protrusions 100ca, detachment of the connection portion 100c may be effectively prevented due to the increased coupling area in spite of an external vibration or impact and the vibration resistance and impact resistance characteristics of the entire battery pack 1 may be improved.

Figure 7:
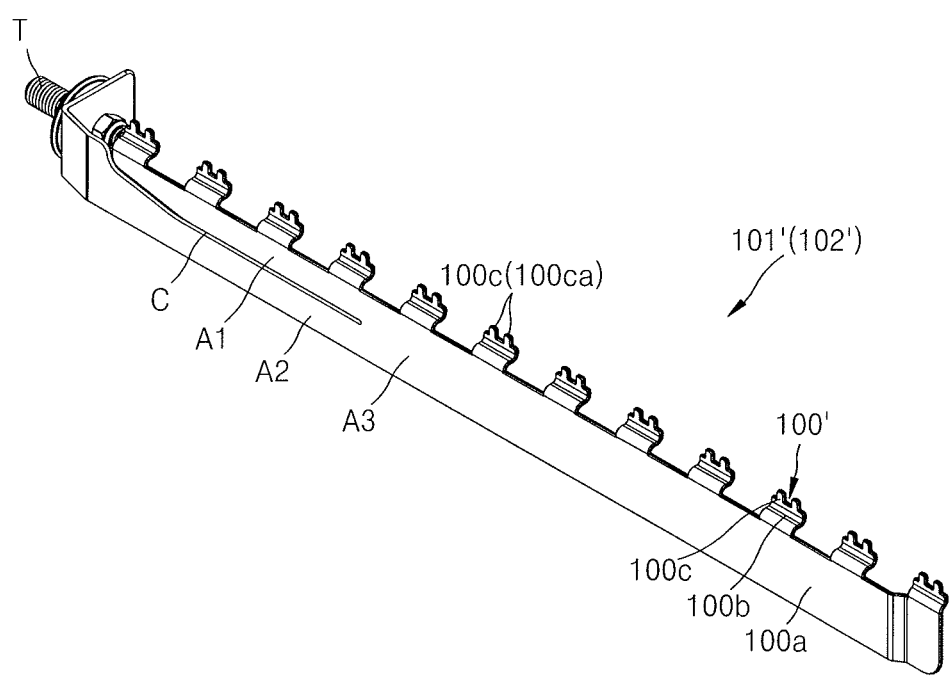
FIG. 7 illustrates a modified embodiment of FIG. 5.

Referring to FIG. 2, the bus bars 101 and 102 may extend along the first and second side portions S1 and S2 of the circuit board 200 to electrically connect the first and second connection holes 201 and 202, which are arranged at different positions to each other and the output terminal T. Accordingly, the electrical resistance between the first and second connection holes 201, 202 (or the battery cells 10) arranged at a relatively close position according to the distance from the output terminal T and the first and second connection holes 201 and 202 arranged at a relatively remote position may be formed differentially. Thus, a relatively large output may be required for the battery cell 10 arranged at a relatively close distance whereas a relatively small output may be required for the battery cell 10 arranged at a relatively remote distance. This may result in the load is nonuniformly distributed according to the position of the battery cell 10, which may promote intensive degradation of the close battery cell 10 with a relatively large load applied thereto and, thus, degradation of the entire battery pack 1. As shown in FIG. 7, which is a modified embodiment of FIG. 5, a cutout portion C for bypassing the charge/discharge path may be formed on the bus bars 101 and 102 providing the charge/discharge path. Thus, unbalanced electrical resistance according to the position of the battery cell 10 may be alleviated and the intensive load on some battery cells 10 and the deterioration of the entire battery pack 1 may be reduced or prevented.

In particular, the cutout portion C may be formed in the bus bars 101' and 102'. The cutout portion C may be formed along the lengthwise direction of the bus bars 101' and 102' extending along the first and second side portions S1 and S2 of the circuit board 200, i.e., along the second direction D2. The cutout portion C may extend from a first end side close to the side of the output terminal T towards a second end side of the bus bars 101 and 102, and may be formed in an open form at the first end side to the outside. In the embodiment illustrated in FIG. 7, the cutout portion C may be formed in a substantially linear shape extending from the first end side to the second end side of the bus bars 101' and 102' and the cutout portion C may be formed in a shape inclined upward at the first end side. For example, the cutout portion C may extend along the third direction D3 from the first end side close to the side of the output terminal T to a middle region along the third direction D3 in the body portion 100a.

Because the cutout portion C is open at the first end side of the bus bars 101' and 102' close to the output terminal T, the first end side of the bus bars 101' and 102' may be separated into a first region A1 not directly connected to the output terminal T and a second region A2 directly connected to the output terminal T. The first region A1 may be relatively closer along the third direction to the circuit board 200 than the second region A2. For example, the first region A1 may include the connection portion 100c connected to the circuit board 200 and the second region A2 may be farther from the circuit board 200 along the third direction D3 than the first region A1. Also, the first and second regions A1 and A2 may be connected to each other through a third region A3 outside the cutout portion C.

For example, the third region A3 may be formed at a position outside the cutout portion C where the cutout portion C is terminated. More particularly, in the embodiment illustrated in FIG. 7, the third region A3 may be formed from an intermediate position of the bus bars 101' and 102' between the first end side and the second end side of the bus bars 101' and 102', i.e., from an intermediate position of the bus bars 101' and 102' where the cutout portion C is terminated. In an implementation, the third region A3 may be formed closer to the second end side of the bus bars 101' and 102', e.g., the cutout portion C may extend further along the second direction D2 than shown.

In the embodiment of FIG. 7, while the first and second connection holes 201 and 202 (or the battery cells 10) arranged close to the output terminal T are not directly connected to the output terminal T through the first region A1, they are still connected to the output terminal T through the second region A2 after bypassing the third region A3. Thus, the charge/discharge path may be formed as a path passing through the second region A2 after bypassing the third region A3 in most of the first and second connection holes 201 and 202 (or the battery cell 10). Accordingly, a difference in the charge/discharge path of the first and second connection holes 201 and 202 (or the battery cells 10) may be reduced and the electric resistance may be equalized.

In an embodiment of the present disclosure, the cutout portion C may be formed in the body portion 100a of the bus bars 101' and 102'. Then, as for the first and second regions A1 and A2 of the bus bars 101' and 102' separated from each other through the cutout portion C, the bent portion 100b and the connection portion 100c close to the circuit board 200 and a portion of the body portion 100a may form the first region A1, and another portion of the body portion 100a located at a relatively long distance from the circuit board 200 may form the second region A2. In this case, the output terminal T may be directly connected to the second region A2 or the second region A2 may be connected to the output terminal T through a conductive path.

According to the present disclosure, a high-density battery pack having a high energy density per the same volume by removing or minimizing the dead space occupied by the bus bar for forming the charge/discharge path between the battery cell and the output terminal or the dead space for connection of the bus bar may be realized.

According to the present disclosure, the electrical resistance of the charge/discharge path may be uniform regardless of the position of the battery cell according to the distance to the output terminal and, thus, a load may be uniformly distributed to all battery cells, thereby preventing the intensive degradation caused by the load concentration on some battery cells.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
a plurality of battery cells;
a circuit board electrically connecting the plurality of battery cells together, the circuit board extending along a first direction and a second direction; and
a bus bar connected to the circuit board to form a charge/discharge path, wherein the bus bar extends along a third direction, different from the first and second directions, and wherein the bus bar includes:
a body portion extending along the second direction, and
connection portions extending in the third direction from the body portion, the connection portions being spaced apart from each other along the second direction, each of the connection portions including connection protrusions separated from each other along the second direction by a recess, and a width of the recess in the second direction being smaller than a space between two adjacent connection portions in the second direction.

2. The battery pack as claimed in claim 1, wherein the third direction is perpendicular to the circuit board.

3. The battery pack as claimed in claim 1, wherein the bus bar extends along the second direction and has a dimension along the third direction that is greater than a dimension along the first direction.

4. The battery pack as claimed in claim 1, wherein the body portion and the connection portions extend along the third direction.

5. The battery pack as claimed in claim 1, wherein the connection portions are connected to respective connection holes in a cell region in which the battery cell is arranged.

6. The battery pack as claimed in claim 1, wherein the bus bar further includes:
a bent portion extending in a bent form between the body portion and each of the connection portions to connect the body portion outside the cell region and each of the connection portions inside the cell region to each other, a single bent portion extending from the body portion to connect to the connection protrusions of a single one of the connection portions.

7. The battery pack as claimed in claim 5, wherein:
the circuit board includes a first surface facing the battery cell and a second surface opposite to the first surface along the third direction, and
the connection portions are inserted into the connection holes in a direction facing from the first surface to the second surface of the circuit board, end portions of the connection protrusions protruding through the connection holes to extend above the second surface.

8. The battery pack as claimed in claim 5, wherein the connection protrusions of a single one of the connection portions are inserted into a same one of the connection holes.

9. The battery pack as claimed in claim 8, wherein the connection protrusions include a pair of connection protrusions separated from each other along the second direction by the recess.

10. The battery pack as claimed in claim 9, wherein the recess accommodates a coupling material.

11. The battery pack as claimed in claim 5, wherein each of the connection protrusions is individually inserted into a corresponding one of the connection holes in the circuit board.

12. The battery pack as claimed in claim 1, wherein the bus bar includes first and second bus bars extending along first and second side portions of the circuit board that are opposite to each other along the first direction.

13. The battery pack as claimed in claim 12, wherein:
the battery cells are arranged in first and second rows along the first direction,
the battery cells of first rows are biased toward the second side portion of the circuit board along the first direction to provide spaces for first connection holes between respective ones of the first rows and the first side portion of the circuit board, and
the battery cells of second rows are biased toward the first side portion of the circuit board along the first direction to provide spaces for second connection holes between respective ones of the second rows and the first side portion of the circuit board.

14. The battery pack as claimed in claim 13, wherein the first bus bar is connected to the first connection holes, and the second bus bar is connected to the second connection holes.

15. The battery pack as claimed in claim 12, wherein:
the circuit board is configured to electrically connect the plurality of battery cells in units of modules, adjacent first and second rows of battery cells forming one module,
the battery cells of first rows are biased toward the second side portion of the circuit board along the first direction to provide spaces for first connection holes between respective ones of the first rows and the first side portion of the circuit board, and
the battery cells of second rows are biased toward the first side portion of the circuit board along the first direction to provide spaces for second connection holes between respective ones of the second rows and the second side portion of the circuit board.

16. The battery pack as claimed in claim 15, wherein the first bus bar is connected through the first connection holes and the second bus bar is connected through the second connection holes to first and second polarities of the module that are different from each other.

17. The battery pack as claimed in claim 1, wherein the bus bar includes a cutout portion extending from a first end side close to an output terminal toward a second end side thereof.

18. The battery pack as claimed in claim 17, wherein:
the cutout portion separates the first end side of the bus bar into a first region not directly connected to the output terminal and a second region directly connected to the output terminal, and
the first and second regions are electrically connected to each other through a third region outside the cutout portion.

19. The battery pack as claimed in claim 18, wherein:
the first region includes a connection portion of the first end side connected to the circuit board, and
the second region is relatively farther from the circuit board along the third direction than the first region.

20. The battery pack as claimed in claim 1, wherein the connection protrusions extend in the third direction, the recess extends in the third direction between facing sidewalls of adjacent ones of the connection protrusions, and the adjacent ones of the connection protrusions being connected to each other only via bottoms thereof.

* * * * *